US009127735B2

(12) United States Patent
Putz et al.

(10) Patent No.: US 9,127,735 B2
(45) Date of Patent: Sep. 8, 2015

(54) FRICTION BRAKE

(75) Inventors: Michael Putz, Gross Enzersdorf (AT); Daniel Auer, Nußdorf-Debant (AT)

(73) Assignee: VE VIENNA ENGINEERING FORSCHUNGS-UND ENTWICKLUNGS GMBH, Tresdorf (AT)

( * ) Notice: Subject to any disclaimer, the term of this patent is extended or adjusted under 35 U.S.C. 154(b) by 727 days.

(21) Appl. No.: 13/321,454

(22) PCT Filed: May 10, 2010

(86) PCT No.: PCT/EP2010/056327
§ 371 (c)(1),
(2), (4) Date: Feb. 21, 2012

(87) PCT Pub. No.: WO2010/133463
PCT Pub. Date: Nov. 25, 2010

(65) Prior Publication Data
US 2012/0168264 A1 Jul. 5, 2012

(30) Foreign Application Priority Data
May 19, 2009 (AT) ..................................... 785/2009

(51) Int. Cl.
F16D 55/22 (2006.01)
F16D 65/66 (2006.01)
F16D 65/18 (2006.01)
F16D 125/26 (2012.01)
F16D 125/32 (2012.01)
F16D 127/10 (2012.01)

(52) U.S. Cl.
CPC ................ *F16D 65/66* (2013.01); *F16D 65/18* (2013.01); *F16D 2125/26* (2013.01); *F16D 2125/32* (2013.01); *F16D 2127/10* (2013.01)

(58) Field of Classification Search
CPC ... F16D 65/18; F16D 2125/26; F16D 65/092; B60T 13/471
USPC .......... 188/70 R, 70 B, 71.1, 71.8, 72.1, 72.2, 188/72.6, 72.9
See application file for complete search history.

(56) References Cited

U.S. PATENT DOCUMENTS

| 3,285,372 A * | 11/1966 | Rossmann | 188/72.2 |
| 5,813,499 A * | 9/1998 | Staltmeir et al. | 188/59 |
| 6,978,868 B2 * | 12/2005 | Schautt | 188/72.7 |
| 7,172,056 B2 * | 2/2007 | Baumann et al. | 188/72.2 |

(Continued)

FOREIGN PATENT DOCUMENTS

| DE | 101 56 348 | 4/2003 |
| DE | 103 24 424 | 12/2004 |

(Continued)

*Primary Examiner* — Vishal Sahni
(74) *Attorney, Agent, or Firm* — Greenblum & Bernstein, P.L.C.

(57) ABSTRACT

A friction brake including a brake part, a friction lining, a friction surface, and a pressing device, arranged on the brake part, that is structured and arranged to press the friction lining against the friction surface. A holding part is located on the pressing device so that the friction lining rests against the holding part. An actuating part is located on the pressing device and rotatably mounted on the brake part and an actuator is structured and arranged to pivot the actuating part. A pin is rotatably mounted in the holding part and being arranged on the actuating part, and a rotational axis of the pin is eccentrically arranged with respect to a rotational axis of the actuating part.

35 Claims, 7 Drawing Sheets

(56) References Cited

U.S. PATENT DOCUMENTS 7,258,206 B2 * 8/2007 Severinsson ............... 188/72.7
7,497,306 B2    3/2009 Severinsson

FOREIGN PATENT DOCUMENTS

DE    10 2007 017246    10/2008
DE    102011004772       8/2012

* cited by examiner

FRICTION BRAKE

CROSS-REFERENCE TO RELATED APPLICATIONS

The present application is a U.S. National Stage of International Patent Application No. PCT/EP2010/056327 filed May 10, 2010, and claims priority under 35 U.S.C. §§119(a) and 365 of Austrian Patent Application No. A 785/2009 filed May 19, 2009. Moreover, the disclosure of International Patent Application No. PCT/EP2010/056327 is expressly incorporated by reference herein in its entirety.

BACKGROUND OF THE INVENTION

1. Field of the Invention

The present invention relates to a friction brake comprising a brake part, preferably a brake caliper, on which a pressure device is arranged for pressing a friction lining against a friction surface, preferably a brake disk.

2. Discussion of Background Information

For a useful design of an electrically actuated brake such as, e.g. a disk brake of a vehicle, the actual forces and energies for actuation and wear adjustment are of interest. The pure wear adjustment takes place slowly over the life of the brake lining and serves for maintaining a certain clearance between brake disk and brake lining (normally less than one mm) during progressing wear of the brake linings (friction linings) or for ensuring that said the clearance does not become too large. When braking, the clearance has to be overcome, what has to take place in less than one second because otherwise the response time of the brake becomes too long with a safety risk. A rough assumption is that the clearance has to be overcome in approximately ¹⁄₁₀ sec. The forces required for overcoming the clearance by pressing are roughly in the range of several 10 N. These forces vary widely with condition (dirt, corrosion, age, etc.), size, and design of the brake. In case of an assumed clearance of 1 mm and a force of 100 N, a work of 0.1 Ws is needed, requiring 1 W if done in ¹⁄₁₀ sec. For the high force to press the brake lining against the brake disk in the case of full braking, several 10 kN are to be expected. The required travel for pressing arises from the elastic behavior in brake linings, brake caliper, and other highly loaded parts of the brake and is usually in the range of approximately several ¹⁄₁₀ mm. In case of full braking with e.g. a maximum force of 40 kN (assumed an average force of 20 kN) and 0.5 mm, thus, 10 Ws work would be needed for pressing on the brake linings, and when actuating the brake within ½ second, thus, on average, 20 W would be needed for full braking of a wheel. The necessary actuating energy and power of vehicle brakes are thus low, in particular in case of normal braking instead of full braking; however, the forces required for this are very high. It is therefore obvious to use an actuating drive with low power and to use a low-friction mechanism for generating the required high forces. Such a mechanism can be found, e.g., in DE 37 16 202 A1 in which a brake lining is arranged on a holding part, the brake lining is pressed or released by a driven cam. Between the holding part and the cam, an intermediate part is arranged on which the cam presses and which is guided in a guide. With this intermediate part, the friction forces occurring due to friction are absorbed and consequently, the brake lining is prevented from rotating together with the brake disk. Thus, self-energization is impossible in case of this brake, and it is always necessary that the pressure mechanism applies the full pressure force. Moreover, such a brake needs a large installation space so that this brake can be used only to a limited extent. Thus, such a brake is primarily used as truck brake where the required space is available.

Such pressure mechanisms for disk brakes are therefore known from truck air brakes. However, the compressed air has only roughly ¹⁄₁₀ of the pressure of a hydraulic brake as, e.g., for passenger cars. Because in case of trucks, the piston surface area and the diameter of the brake disk are larger, the normal force of the brake lining can only be achieved with an additional mechanical transmission which is the reason that is necessary that pneumatic brakes can be used on trucks. In case of conventional hydraulic brakes, the same pressure is applied everywhere and thus the same normal force. Because no self-energization takes place, friction force and braking torque are the same everywhere. Therefore, such hydraulic brakes provide excellent conditions for uniform braking which is the reason why in today's vehicles hydraulic brakes are still installed. Actually, the pneumatic brake is an analogy to the hydraulic brake; however, the brake lining is not directly driven with compressed air (insufficient pressure) as with hydraulics, but with the transmission cam.

The high forces required for braking cannot be readily generated by a simple lever with the lever ratio because, due to the limited forces of the actuating drive, the transmission ratios would become disadvantageous such that, mainly due to the limited space in the region of the wheels of a vehicle, it would not be possible to constructionally implement such a lever. Here, in particular the arrangement of the needed bearings for such a lever would create serious problems so that in practice, a simple lever cannot be used. An example for this is DE 103 24 424 A1, which shows a brake which, for braking, presses a support lever against a brake disk. However, the possible force transmission is limited by the installation space available for the brake and the bearings necessary to support the lever. Thus, a powerful drive would be necessary which, however, is disadvantageous in practice for the use in a vehicle, or, as in DE 103 24 424 A1, the brake has to provide a significant portion of the braking forces by self-energization.

However, highly self-energizing brakes always involve the risk of unequal self-energization and non-releasable blocking of the brake, especially if the resulting friction is higher than expected. Firstly, the higher the self-energization of a brake, the stronger is the dependency of the braking torque on the coefficient of friction and, secondly, the high self-energization is always bound to an angle which is determined by the friction coefficient. Thus, the highly self-energizing brake is very sensitive to the exact angle setting which makes controlling such a brake difficult and complicated. Thus, self-energization is always also a problem for the determination of the actual braking torque. In known brakes such as, e.g. in DE 103 24 424 A1 or DE 101 56 348 C1, which shows an electrically actuated brake, a correspondingly high effort is therefore required to prevent blocking or to be able to adjust the degree of self-energization. Thus, in DE 101 56 348 C1, e.g., two drives working against each other are provided for controlling the self-energization, whereby the complexity of controlling is increased accordingly.

From DE 10 2007 017 246 A1, a brake comprising a rotatably mounted force transmission element having ramps is implied, which is in engagement with a lining carrier. By pivoting the force transmission element by an electromotive actuator, the force transmission element is pivoted about its rotational axis, whereby the ramp, in the form of a cam control, displaces the lining carrier, on the one hand, in the rotational direction of the brake disk and, on the other, presses the lining carrier with brake lining against the brake disk. Due to the engagement between force transmission element and lining, also, an enforced self-energization occurs including the above-mentioned associated problems.

SUMMARY OF THE EMBODIMENTS

Embodiments of the present invention to provide a friction brake which, while maintaining a very compact design and without the need of any self-energization, is able to provide the high forces required during braking by an actuating drive having low actuating energy in a very short time and with very low friction.

Accordingly, embodiments of the invention include a holding part, against which the friction lining rests, and an actuating part are provided on the pressing device. The actuating part is rotatably mounted on a brake part, and an actuator is hinged at the actuating part for pivoting the actuating part, and a pin is rotatably mounted to the holding part, and arranged on the actuating part. The rotational axis of the pin is arranged eccentrically to the rotational axis of the actuating part. By this arrangement, it becomes possible to implement high force transmissions within a very small space which, in turn, allows using a low-energy actuating drive. In this manner and by the particularly compact design, it is also possible to implement very small strokes, which enables very short response times of the friction brake.

In order to nevertheless allow self-energization as a useful effect, it can be provided in the embodiment comprising the eccentric rotational axes of actuating part and pin that the friction lining is rigidly fastened on the holding part whereby self-energization is made possible.

However, self-energization is not utilized as basic principle for the friction brake according to the invention, but is only occasionally accepted as a useful effect. Generating the necessary braking forces is not based solely on self-energization, but is primarily provided by a pressing mechanism. However, according to embodiments, self-energization is nevertheless allowed and can be a convenient side effect which occurs and supports braking, e.g. because in case of a passenger car, due to the dynamic wheel load distribution, a very high braking force is required at the front at full braking applications.

It is particularly advantageous that a shaft piece is provided as the actuating part at the axial end of which shaft piece, the pin is arranged because such a shaft piece can be rotatably mounted in a very simple manner by standard components such as, e.g., anti-friction bearings.

It is likewise advantageous that as an actuating part, a hollow shaft is provided. The continuous axial recess is arranged eccentrically to the rotational axis of the hollow shaft, and the pin is inserted into the recess because, on the one hand, mounting can be implemented again in a very simple manner and, on the other, the necessary eccentricity can be manufactured in a very simple manner. As a further advantageous configuration, the actuating part can be designed as a hollow shaft, in which the continuous axial recess has a non-circular cross-section, and the pin is inserted into the recess. Such a recess can be manufactured in a simple manner and makes it possible to operate the brake equally effective in both directions.

If the rotational axis of the pin is arranged in an initial position in such a manner that by the resulting eccentricity in distance and angle with respect to the rotational axis of the actuating part, a self-weakening occurs at the beginning of the pressing movement of the brake lining and a self-energization occurs at the end of the pressing movement, a progression of the pressing force (and thus the braking effect) can be adjusted via the pressing movement and can be configured in an optimal manner, e.g. also depending on the actuating unit.

In order to be able to generate the required high pressing force in a simple manner, preferably a lever part, with which the actuator is engaged, is arranged at the actuating part, whereby a very high lever transmission can be implemented.

During the use of the friction brake, it is advantageous if a wear adjustment device is provided at the movable brake part, and the pressure device is arranged on the wear adjustment device. In this manner, progressive wear can be compensated in a simple and secure manner without affecting the function of the brake. Particularly advantageous, a wear adjustment drive is arranged on the wear adjustment device, so that the drive drives a threaded spindle on which a threaded sleeve is arranged which is arranged in a wear adjustment part. The pressure device is arranged at the wear adjustment part. The self-locking effect of a threaded spindle can be utilized here in a simple manner so as to be able, during a braking process, to transmit the occurring high forces onto the brake disk.

In order to reduce friction and thus wear, advantageously, a clearance restoration device can be provided which restores a clearance after breaking. This ensures that the brake lining is completely removed from the friction surface after braking. Particularly advantageous, a recess is provided on the movable part of the wear adjustment device, preferably on the wear adjustment part, in which recess a pin is a arranged, and this pin is spring-loaded by a spring against a stationary part of the disk brake, preferably the wheel bearing part. The pin is installed with lateral play in the recess. Thus, with a constructionally simple arrangement, it can be ensured that a clearance is restored after braking.

In case of frequent or prolonged braking, it can happen that the brake heats up excessively which, in turn, can result in that the brake lining is not completely removed from the friction surface after braking, and the pressing forces remain. This results in increased wear and can even cause blocking of the brake. In order to prevent this, the pressure device can be provided with a travel reserve in order to retract the holding part beyond a home position. Alternatively, the wear adjustment device can be provided with a power reserve in order to overcome the press-on forces remaining after braking.

The friction brake according to the invention is preferably activated by a control unit which is connected via cabling to a sensor arranged on a part of the friction brake and receives measured values from the sensor and processes the measured values into a control signal. The control unit is connected via cabling to the wear adjustment device and/or the pressure device. This ensures that the friction brake is optimally controlled or actuated in all operating situations, which increases the safety of the brake or the vehicle in which the brake is installed.

For simplifying the sensors, it can be provided to determine further values in the control unit from the measured values and to process them into a control signal. Thus, sensors can be saved, and necessary values can be determined with sufficient accuracy by available formulas, models, etc.

In order to further increase the operational safety of the friction brake in a simple manner, it can be provided to monitor the operational capability in the control unit by measuring electrical variables or by comparisons of measured values or by comparing measured values with stored values.

In order to increase the operational safety, the control unit can also be used to enable braking even in the event of an error, when the control unit, for the purpose of braking, only activates the wear adjustment device or only the pressure device. Likewise, for further increasing the operational safety, it can be provided to redundantly arrange a cabling, a sensor, an actuator, a control unit, an electric unit, and/or an electronics unit of the friction brake.

The control unit can be programmed in a simple manner in order to activate the wear adjustment device and/or the pressure device for implementing a parking brake function or a hill holder function.

In order to eliminate or reduce the negative effects of the brake hysteresis, it is preferably provided that for the desired actuating or positioning processes, the control unit determines a travel presetting for the wear adjustment device and/or the pressure device and transmits the control signal of the travel presetting to the wear adjustment device and/or the pressure device. However, it is also possible to store the brake hysteresis for the friction brake in the control unit, which enables the control unit to compensate the brake hysteresis when generating a control signal to the wear adjustment device and/or the pressure device.

If on both sides of the friction surface, a friction lining is arranged, and a pressing device is provided on both sides, the pressing movements become advantageously smaller because they have in each case only one friction lining to press on. This can result in better response times of the friction brake or allows optimizations in the transmission of the press-on action.

It is particularly advantageous that the friction brake according to the invention can also be used as friction clutch because with respect to the basic principle, there is no difference between friction brake and friction clutch.

BRIEF DESCRIPTION OF THE DRAWINGS

The present invention is explained in more detail by means of the exemplary and non-limiting FIGS. 1 to 9 which show advantageous configurations. In the figures.

DETAILED DESCRIPTION OF THE EMBODIMENTS

Figure 1:
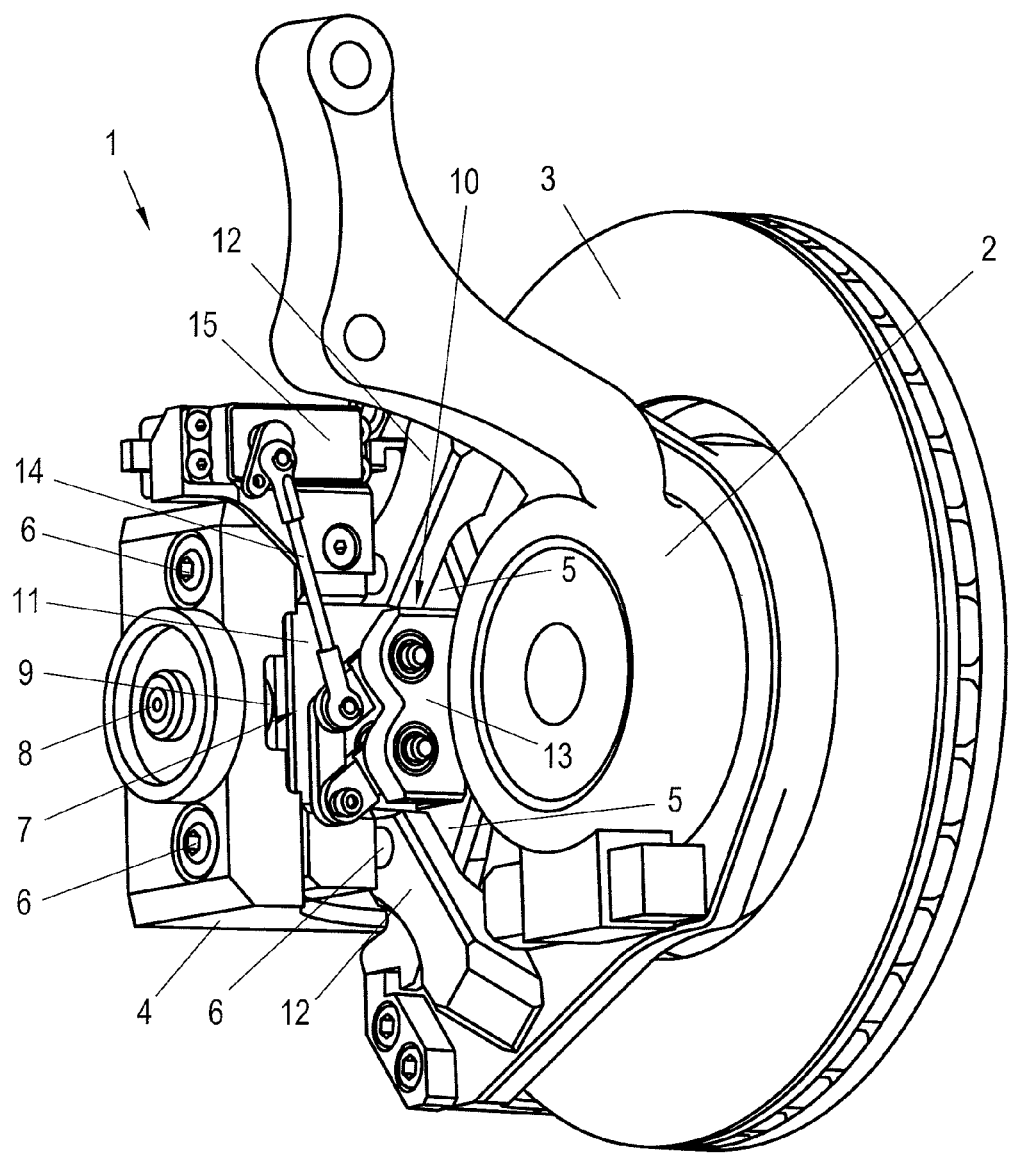
FIG. 1 shows a perspective view of the friction brake according to the invention, here implemented as a disk brake.

FIG. 1 illustrates the friction brake 1 according to the invention, here, e.g., a disk brake for a wheel of a vehicle. The following explanations are based on a disk brake. Since in case of friction brakes, the given objects are in principle always wear adjusting and overcoming the clearance, applying high friction lining pressure forces and, if necessary, self-energization and low-friction actuation, the method is also equally suited for other friction brakes such as multiple disk brakes in which the first and the last disk in the package are pressed against each other, and for shoe brakes in which the (mostly) two shoes are pressed on the outside or inside against a brake drum. All friction brakes have in common that a friction lining (here a brake lining) is pressed by a pressing device or (pressure device) against a friction surface (disk or drum).

The wheel (not shown here) is rotatably mounted in a known manner on the wheel bearing part 2 and the brake disk 3 is arranged thereon also in a manner known per se. Here, the movable part of the brake, implemented here as a brake caliper 4, is also movably arranged on the wheel bearing part 2. However, the brake caliper 4 can also be arranged on another, stationary part of the vehicle. The brake caliper 4 is implemented here as a known floating caliper, wherein the brake caliper 4 encloses the brake disk 3 and on both sides of the brake disk 3, in each case one friction lining 5 (here brake lining) is arranged. The brake caliper 4 is guided and retained here by two guide rods 6 which are arranged on the wheel bearing part 2. However, it is of course also possible to implement the brake caliper 4 different than as a floating caliper, and it can also be arranged on the wheel bearing 2 in a manner other than by two guide rods 6.

Figure 5:
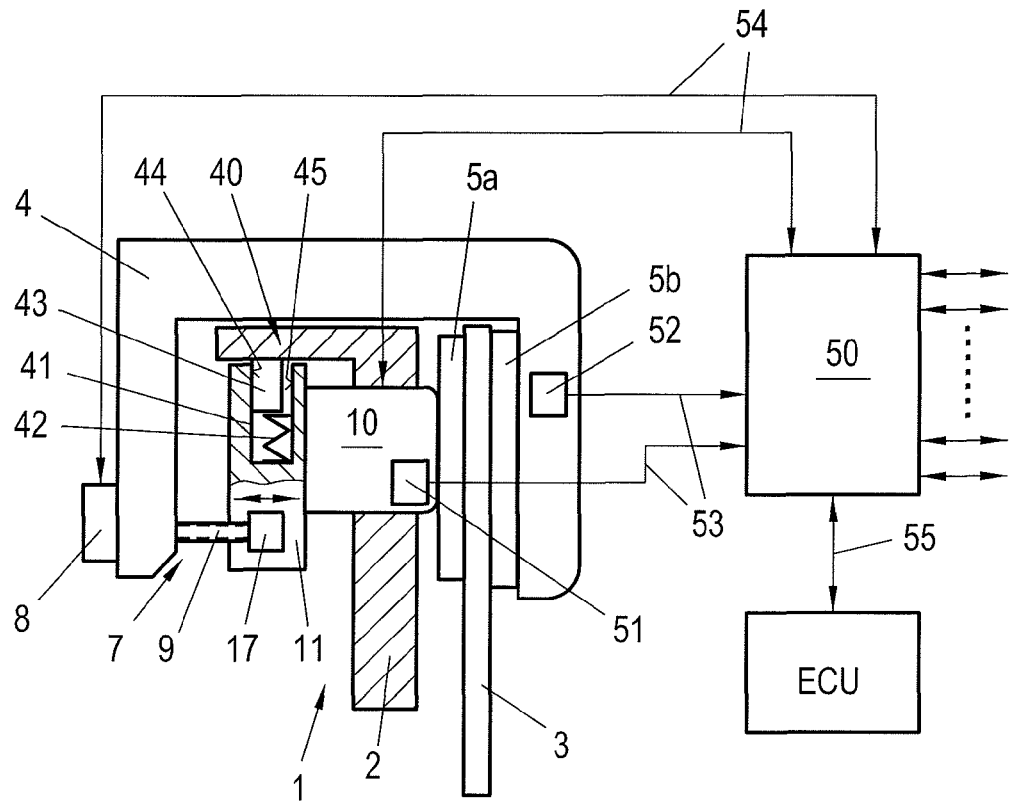
FIGS. 5 and 6 show a schematic illustration of the disk brake with a device for restoring a clearance before and after braking.

As a movable part of the friction brake 1, a wear adjustment device 7 can be provided on which a pressing device 10 is arranged for pressing the brake lining 5 against the brake disk 3 as described in more detail below with reference to FIG. 2. As in the illustrated exemplary embodiment, the wear adjustment device 7 can be arranged on the brake caliper 4, but could also be arranged on a stationary part of the friction brake 1. The wear adjustment device 7 serves to compensate for the wear resulting from the operation of the brake 1 and to maintain a desired clearance between brake lining 5 and brake disk 3. For this purpose, a threaded spindle 9 is provided here in the brake caliper 4, which spindle is driven by a wear adjustment motor 8, e.g. a simple electric motor. On the threaded spindle 9, a movable wear adjustment part 11 is arranged via a threaded sleeve 17 (not visible in FIG. 1; see FIGS. 5 and 6), e.g. fitting the threaded spindle 9, which can be moved linearly back and forth by rotating the threaded spindle 9 by the wear adjustment motor 8. In this manner, the wear adjustment part 11 and thus also the brake lining 5 can be moved by rotating the threaded spindle 9 of the wear adjustment part 11 so as to maintain a desired clearance. Even in case of a very poor thread efficiency factor, this object can be well mastered with a thread and the additional advantage that the wear adjustment device is self-locking under load, even when additional press-on forces are introduced, e.g. during braking. In the illustrated exemplary embodiment, the wear adjustment device 7 also partially absorbs the friction force of the brake lining 5 generated during braking and dissipates the friction force via wear adjustment stops 12 arranged on the wheel bearing part 2 into the wheel bearing part 2 so as to prevent the friction brake 1 from being rotated. In order to be able to use the friction brake 1 in both driving directions, wear adjustment stops 12 are provided at the top and at the bottom.

For actuating the friction brake 1, thus for pressing the brake lining 5 against the brake disk 3, the pressing device 10 is used. The brake lining 5 can be rigidly fastened on a holding part 13 of the pressing device 10, and the pressing device 10, as described in detail below, can be arranged on a part of the brake caliper 4, here on the wear adjustment device 7. Here, the holding part 13 is U-shaped and encloses a part of the wear adjustment device 7 such as, e.g. the wear adjustment part 11 or another part of the brake caliper 4. The pressing device 10 is actuated by an actuator 14, here, e.g., a rod, wherein the actuator 14 is driven by an actuating drive 15. The actuating drive 15 provides the pressing energy which is transformed by the pressing device 10 with high low-friction transmission into a high pressing force of the brake lining 5. The actuating drive 15 is, e.g., an electric motor which actuates the actuator 14 via a lever. Due to the fact that the pressing device 10 is directly and rigidly connected to the holding part 13 (or the brake lining 5), the resulting entrainment forces act also on the pressing device 10, whereby self-energization can be created, as described in more detail below.

Figure 2:
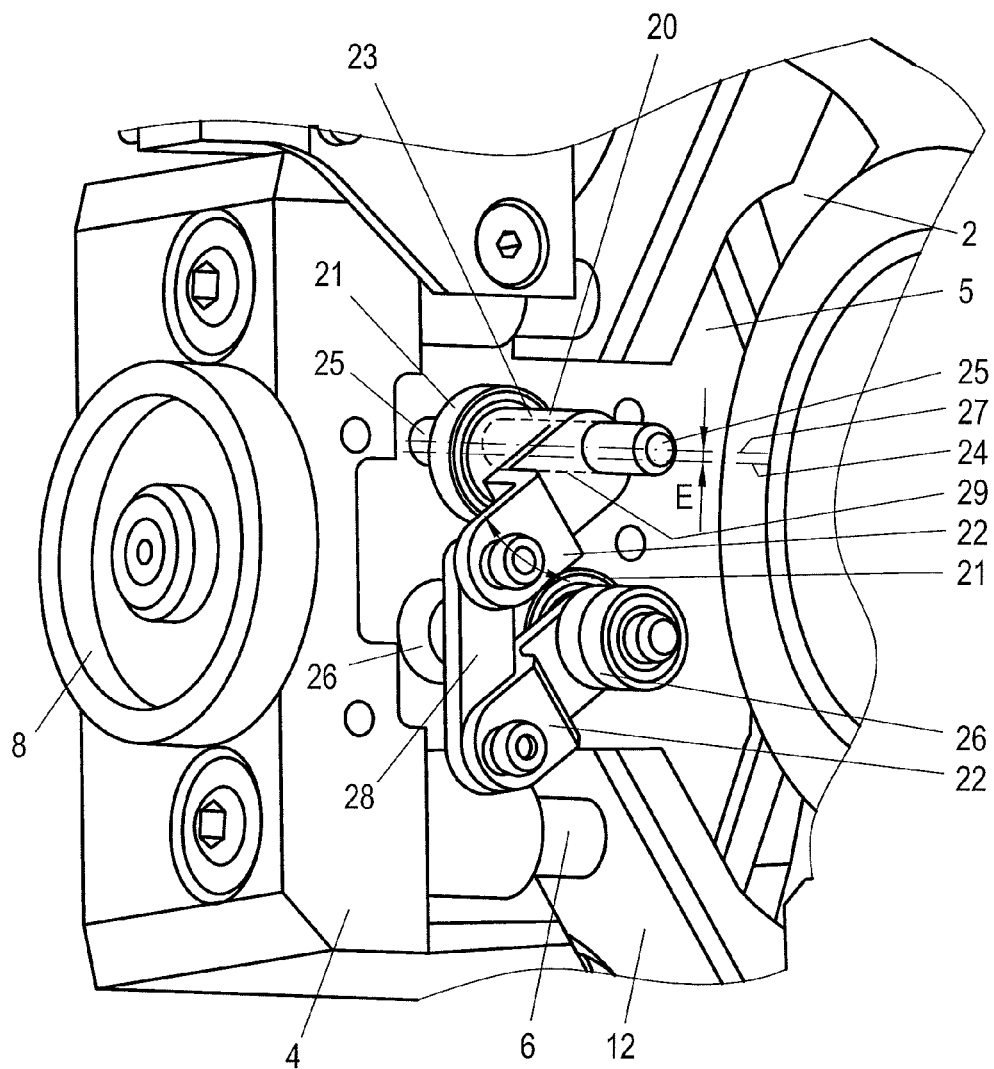
FIG. 2 shows a detailed view of the pressing device of the brake according to the invention, again implemented as a disk brake.

For a better understanding, FIG. 2 shows the pressing mechanism as a detail and cut-out, thus without holding part 13, partially without bearing, without actuator 14 and only with parts of the wear adjustment device 7. An actuating part 20 is arranged rotatably mounted via bearing 21 in a brake part, here in the wear adjustment device 7 or in another part of the brake caliper 4. Here, the actuating part 20 is implemented as shaft piece 23 with a lever 22 fastened thereto which, as shown here, is arranged, e.g., at an axial end of the shaft piece 23. The bearings 21 are arranged on the shaft piece 23. The lever part 22 is in engagement with actuator 14 by which the actuating part 20 can be pivoted about the rotational axis 24 of the bearings 21.

At an axial end of the actuating part 20, an axial pin 25 is arranged to be rotatably mounted via bearing 26 in the holding part 13 of the pressing device 10. In case of a U-shaped design of the holding part 13, as in the shown exemplary embodiment, preferably axial pins 25 and bearings 26 are provided on both sides of the actuating part 20. However, the rotational axis 27 of the pin 25 is arranged eccentrically to the rotational axis 24 of the actuating part 20, which is indicated in FIG. 2 by the eccentricity E.

Because the actuating part 20 is arranged on a brake part such as the brake caliper 4 or the wear adjustment device 7, by pivoting the actuating part 20, the holding part 13 is moved by the eccentricity E of the pin 25 toward the brake disk 3 or away therefrom, and with this, the brake lining 5 is pressed on or released. If the actuating part 20 is arranged on the wear adjustment device 7, the self-locking thread of the threaded spindle 9 ensures that by the pressing device 10, a pressing force can be applied onto the brake lining 5. If the actuating part 20 is implemented other than by the threaded spindle 9, it is to be provided that the wear adjustment device 7 is fixed in place when the pressing device 10 is actuated.

In order to achieve uniform pressing of the brake lining 5 on the brake disk 3, it is also possible to provide two or more actuating parts 20 with pins 25 in the pressing direction. It is also conceivable to arrange the pins 25 only on one side of the actuating part 20. In the illustrated example, two actuating parts 20 are provided, on each of which one pin 25 is arranged and which are in each case mounted via bearings 26 in the holding part 13. Thus, the pressing forces are advantageously transferred at four places and thus very uniformly to the braking pad 5. The lever parts 22 of the two actuating parts 20 can also be connected via a connecting part 28 so as to form a parallelogram in order to achieve a forced synchronous movement of the two actuating parts 20. In this case, the actuator 14 has to engage with only one of the lever parts 22. However, in case of a plurality of actuating parts 20, it is also possible to use different geometries, eccentricities E (amount and angle), and/or lengths of the lever part 22 so as to generate locally different press-on forces and movements.

The pin or pins 25 can be rigidly fastened on the actuating part 20, e.g. by welding or by integrally fabricating the actuating part 20 with the pin/pins 25. Alternatively, the shaft piece 23 of the actuating part 20 can also be designed as a hollow shaft, wherein the axially continuous recess 29, here a circular bore (indicated by the dashed line in FIG. 2), is implemented so as to extend through the shaft piece 23 and eccentrically to the rotational axis 24 of the actuating part 20. A continuous pin 25 can now be inserted into the bore 29, wherein the pin is again arranged eccentrically to the rotational axis 24 of the actuating part 20.

Figure 3:
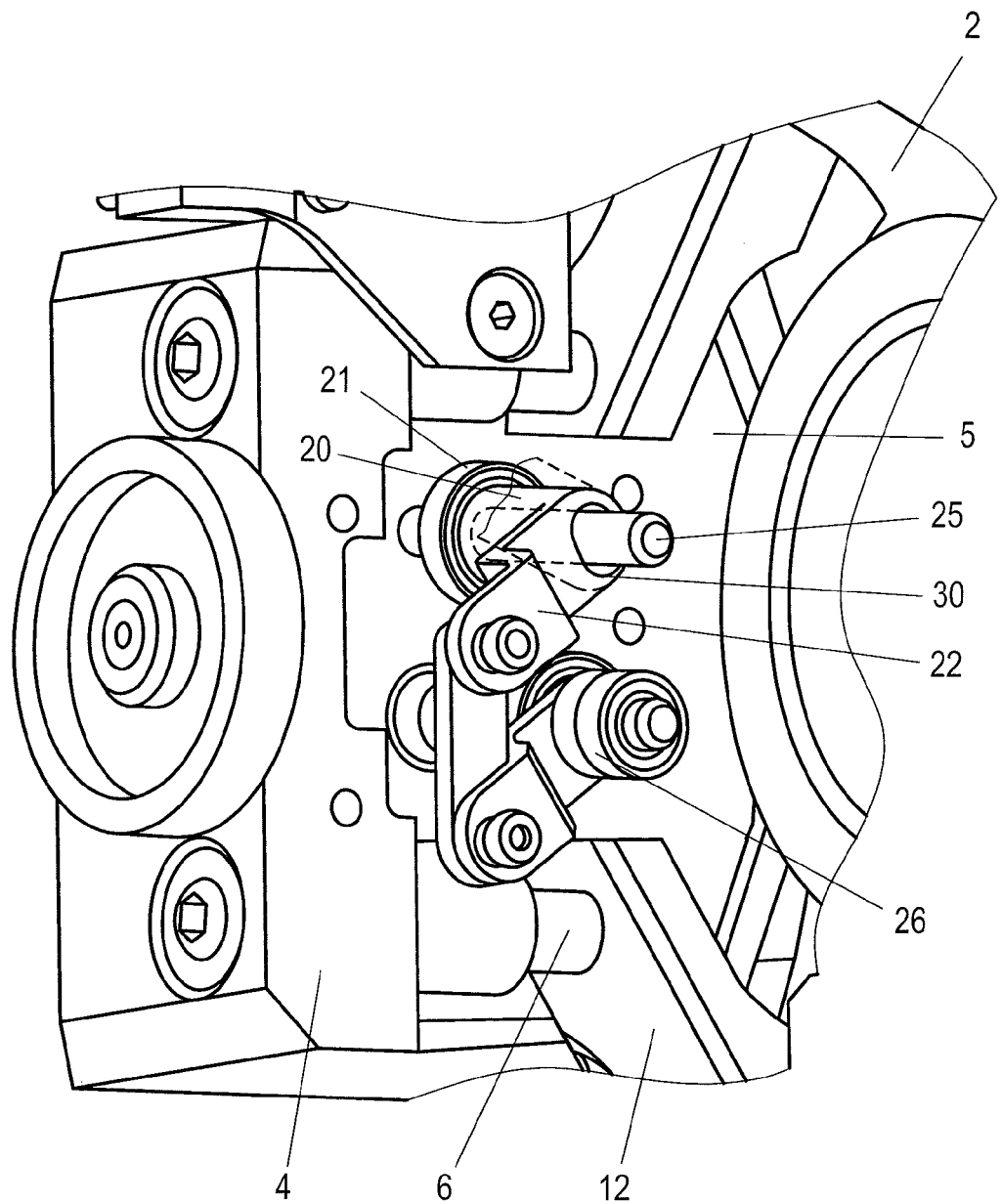
FIG. 3 shows a detailed view of a further configuration of the brake according to the invention, again implemented as a disk brake.

FIG. 3 illustrates a further advantageous configuration of the friction brake 1 according to the invention. In this example, in the actuating part 20, a continuous, eccentrically arranged bore 29 is not provided for the pin 25 is to be inserted, but instead a recess 30 having a non-circular cross-section, e.g. in the from of an oblong hole, is provided, which extends through the actuating part 20 and into which the pin 25 is inserted and arranged to be movable in the recess 30. However, the cross-section of the recess 30 can also be shaped differently such as, e.g., elliptically or as a curved oblong hole. Here, the eccentricity E results from the cross-sectional shape of the recess 30 by the movability of the pin 25 between the ends of the non-circular recess 30, as explained below by the example of an oblong hole.

By pressing on the brake lining 5 with the pressure device 10, depending on the position of the actuating part 20, the pin 25 in the recess 30 (here an oblong hole) is pressed against an end of the oblong hole 30 which acts as a stop, whereby again an eccentricity E between the rotational axis 24 of the actuating part 20 and the resulting rotational axis 27 of the pin 25 is created. Thus, a point of application of the pressing force about the rotational axis 24 of the bearing 21 is created. The pressing force is introduced via the pin 25 and the bearings 26 into the holding part 13 and thus into the brake lining 5. For the opposite driving direction, the actuating part 20 can be shifted as indicated in FIG. 3 by the dashed line, whereby then, the pin 25 is pressed on the other end of the recess 30. The pressing forces for braking are generated here as described above with respect to FIG. 2. Since by this embodiment, the high forces on the region of the recess 30 and the pin 25 remain limited, the end of the lever part 22 can be used as above for the drive. Thus, a brake acting equally for both driving directions, optionally also by utilizing an occurring self-energization, can be achieved.

Of course, the above-described bearings 21, 26 can also be implemented in such a manner that that they do not enclose the whole circumference of the actuating part 20 or the pin 25 as, e.g., in case of the use of a conventional ball bearing, but only that portion of the circumference that is necessary for the pressing movement. Likewise, it is also possible that the shaft piece 23 of the actuating part 20 or a pin 25 does not have a circular cross-section but, e.g., only a sector of a circle.

However, the brake lining 5 does not have to be rigidly connected to the holding part 13, but it is sufficient if the braking pad 5 only rests against the holding part 13. However, in such an arrangement, no self-energization can occur because the entrainment forces acting on the brake lining 5 have to be absorbed in a different manner, e.g. by the wear adjustment stops 12.

Figure 4:
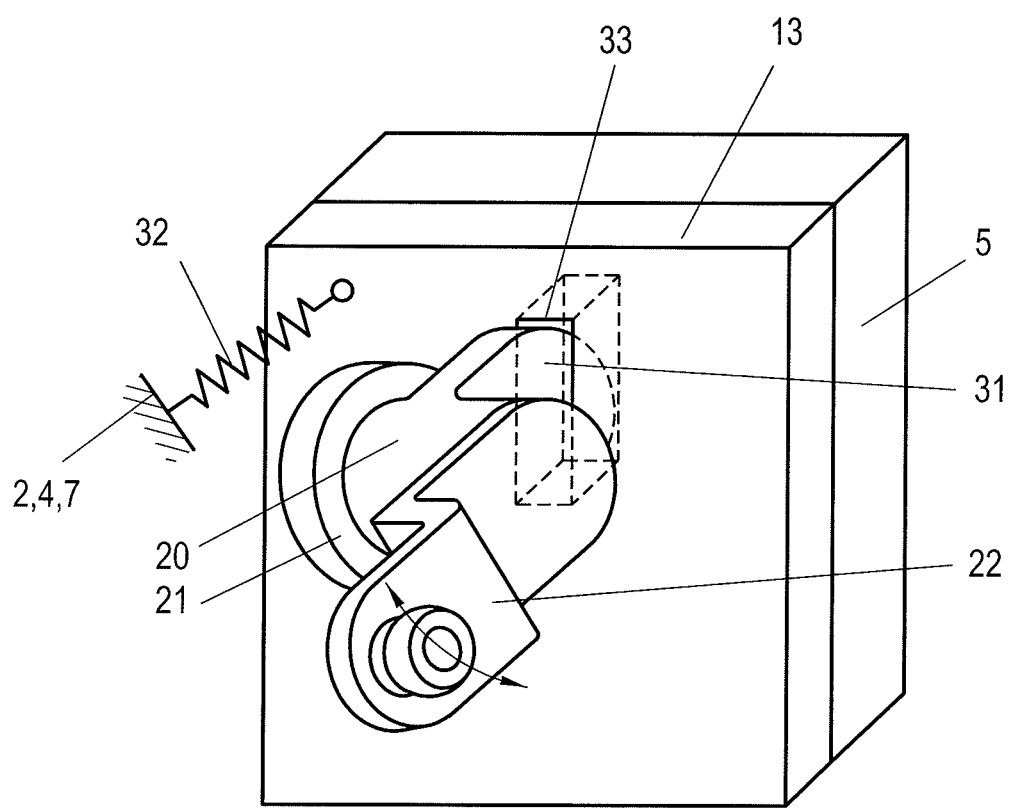
FIG. 4 shows a further configuration of a pressing device of a brake.

Another configuration of a friction brake 1 with a pressing device 10 for generating a high pressing force at a small stroke and low actuating energy is illustrated in FIG. 4. For a better understanding, only the actuating part 20 and the holding part 13 with the brake lining 5 are illustrated here, wherein only one actuating part 20 is illustrated. Of course, analogous to the above, it is also possible that a plurality of actuating parts 20 is provided in order to achieve a more uniform pressing. The actuating part 20, in turn, is arranged rotatably mounted via a bearing 21 in the movable part of the friction brake 1 such as, e.g., the brake caliper 4 or the wear adjustment device 7, and can be pivoted again via a lever part 22, as already described in detail above. Here, a cam 31 is formed or arranged on the actuating part 20 and rests against the holding part 13. However, it is also possible that a plurality of cams 31 is provided on an actuating part 20 so as to achieve a more uniform pressing. When pivoting the actuating part 20 for braking, the holding part 13 is moved according to the lift curve of the cam 31 toward the brake disk 2, so that through the configuration of the lift curve, the curve of the pressing force progression can be predetermined. In order to be able to absorb the entrainment force occurring due to the friction between brake lining 5 and brake disk 3 by the pressing device 10, which is the prerequisite for self-energization, a stop is provided on the holding part 13, which stop interacts with the cam/cams 31 in order to prevent the brake lining 5 from being entrained by the resulting entrainment forces. The stop can be implemented, e.g., as an indentation 33 in the holding part 13 in which the cam 31 engages. Also conceivable is a projection on the holding part 13, which projection interacts with the cam 31 for preventing an entrainment.

In order to withdraw, after braking, the holding part 13 with the brake lining 5 from the brake disk 2 again, an end of a spring 32 can be arranged on the holding part 13. The other end of the spring 32 can be arranged on the movable part of the friction brake 1 such as, e.g., the brake caliper 4 or the wear adjustment device 7, but also on a stationary part of the friction brake 1 such as, e.g., the wheel bearing part 2, whereby, when the actuating part 20 pivots back, the holding part 13 is pulled back again by the spring 32 into the initial position. In order to reduce the friction between cam surface and holding part 13, it can be provided to mount the surface of the cam 31 in a low-friction manner with respect to the holding part 13, e.g. in a suitable roller bearing. In this case, the bearing could also be configured in such a manner that the holding part 13 is fixedly connected to the cam 31, e.g. via the bearing cage, whereby, when the actuating part 20 pivots back, the holding part 13 would be pulled back, and the spring 32 would no longer be necessary.

Figure 6:
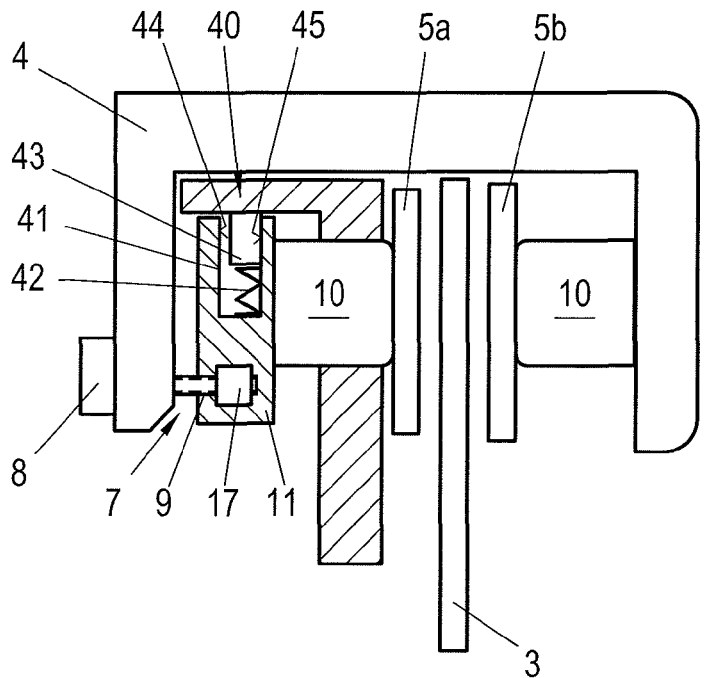

However, it is of course also possible to implement the wear adjustment device 7 and/or the wear adjustment stops 12 in a different manner, or to implement the friction brake 1 without wear adjustment device 7. In the latter case, the pressure device 10 could be arranged directly on a movable brake part, e.g. the brake caliper 4, as shown in the exemplary embodiment. However, the pressure device 10 could also be arranged on a stationary brake part, e.g. a fixed brake caliper. Likewise, it is also conceivable to implement the brake caliper 4 not as a floating caliper, but to provide only one brake lining 5 on the one side of the brake disk 3. The wear adjustment device 7 could also be carried out on the other side of the brake disk 3 (thus toward the outside of the vehicle) or on both sides of the brake disk 3. Likewise, it is possible to arrange on both sides of the brake disk 3 in each case one pressing device 10 with brake lining 5 (as indicated in FIG. 6). The pressing movements become smaller because only one lining has to be pressed on. This can result in better response times or allows for optimizations in the transmission of the pressing. In particular, this results in a particularly advantageous configuration of a friction brake 1 according to the invention having a brake caliper 4 implemented as a floating caliper, wherein on one side of the brake disk 3, a wear adjustment device 7 is arranged on which a first pressing device 10 with brake lining 5a is arranged, and on the other side of the brake disk 3, a second pressing device 10 with brake lining 5b is arranged on the brake caliper 4 (FIG. 6).

In order to be able to achieve the required pressing forces with very small strokes and with low actuating energy, very high force transmissions are necessary which can be achieved in that the eccentricity E is selected to be very small or the lift curve of a cam 31 is configured correspondingly. For the disk brake 1 according to the invention, the eccentricity E or the projection of the cam 31 in case of passenger cars lies in the range of approximately 0.1 mm to 1 mm, whereby at sufficient compactness of the disk brake 1, force transmission ratios of approximately 1:20 to 1:5000 (at lengths of the lever part 22 in case of passenger cars of approximately 20 mm to 50 mm) can be implemented. The lower limit of the eccentricity E or the projection of the cam 31 results from the elastic deformation of the structural components, which needs to be overcome. Due to the small installation dimensions available, the length of the lever part 22 is desired to be small. With the same actuating drive 15 (or the same actuating energy), the pressing forces decrease of course proportionally with the length of the lever part 22. For light passenger cars, a smaller eccentricity E or projection of the cam 31 is sufficient; for heavy vehicles (trucks, trains), the eccentricity E or the projection of the cam 31 is required to be greater corresponding to the elasticities and press-on forces.

Figure 7:
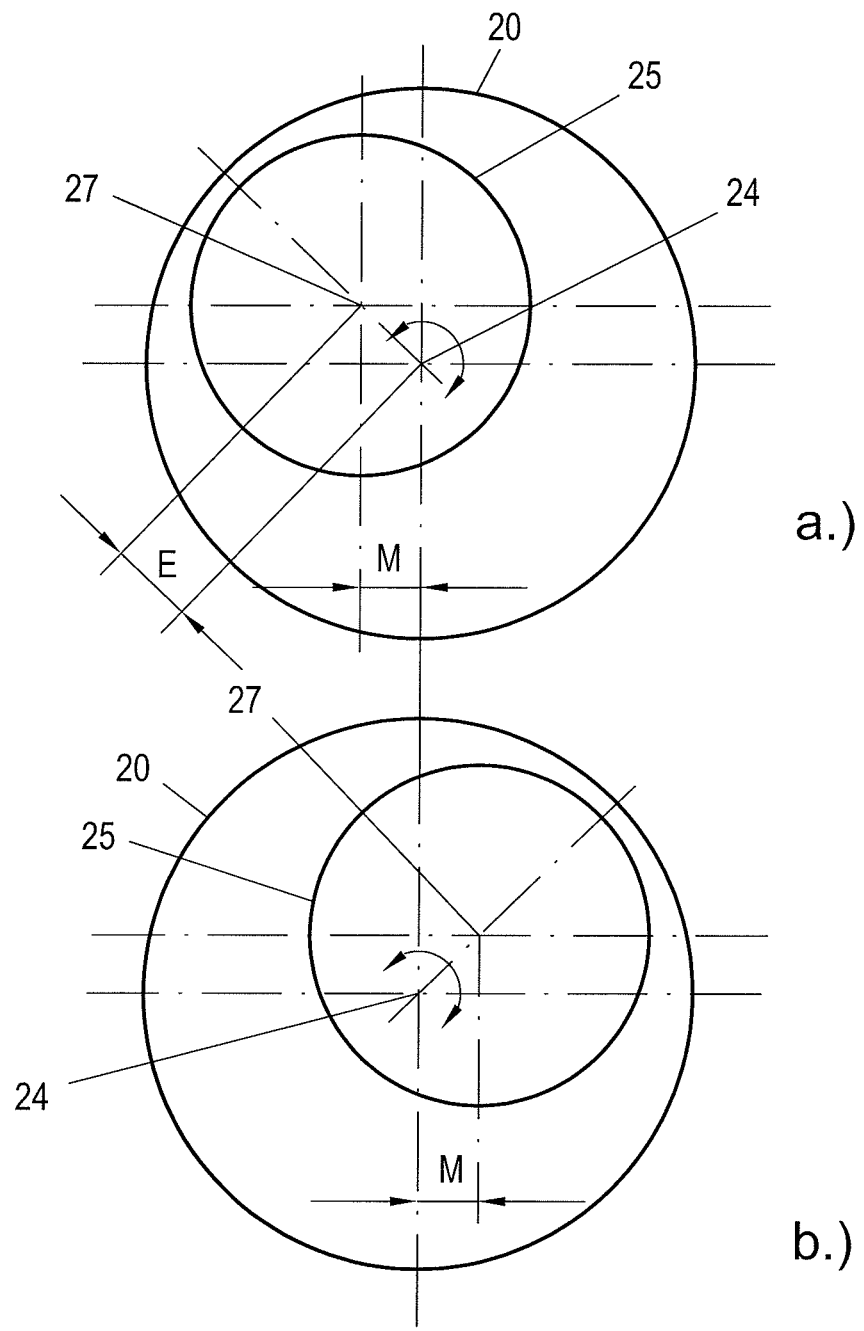
FIG. 7 shows a schematic illustration of the influence of eccentricity on self-energization.

However, the eccentricity E or the lift curve of the cam 31 can be selected not only based on the amount, but also based on the angle with respect to a reference axis, e.g. the axis of symmetry of the lever part 22. If during braking, the brake lining 5 is entrained due to friction by the brake lining 5, the entrainment force can work against the pressing force or can support the pressing force, whereby even a "negative" self-energization (thus a self-weakening) is possible. Through the selection of the position of the eccentricity E or through a suitable configuration of the lift curve of a cam 31 (and optional configuration of the stop on the holding part 13), it is therefore possible to set a combination of self-weakening and self-energization, as explained by way of FIG. 7 using an example of an eccentricity E. Of course, a lift curve of a cam 31 could be configured correspondingly. FIG. 7a illustrates a possible home position of the actuating part 20 on which a pin 25 is arranged eccentrically, as described above. When the pressing device 10 is actuated, thus, the actuating part 20 pivots about the rotational axis 24, the rotational axis 27 of the pin 25 (and therefore also the holding part 13 fastened thereto) moves from the starting point (FIG. 7a) on the left of the rotational axis 24 (region of self-weakening) to the vertex (no self-energization) up to the end point (FIG. 7b) on the right of the rotational axis 24 (region of self-energization). Self-weakening or self-energization results from the points of application of the acting forces (entrainment force, press-on force). This means the pivot angle within which the actuating part 20 can be rotated, together with the center distance M of the rotational axes 24, 27 (corresponds to the angle of the eccentricity E with respect to the lever part 22) and the eccentricity E, determines the progression of the actuating forces of the friction brake 1. As shown, the self-energization can be selected from regions of higher self-energization, regions without self-energization and regions of counteracting forces which, in contrast to self-energization, require even higher actuating forces, wherein the resulting self-energization is always to be considered only as support for the press-on force provided by the pressure device 10. Of course, this offers also the possibility to provide only self-weakening or only self-energization. Also, an advantageous progression of the actuating forces over a wide range of brake actuation (from moderate braking to full braking) can be configured. For example, in the region of low braking torques and press-on forces, "negative" self-energization can be selected, in case of increasing braking torques and press-on forces, the region without self-energization can be passed through and in case of extremely high braking torques and pressing forces, self-energization can reduce the actuating forces. This allows configuring an approximately uniform progression of the actuating forces over the desired braking torques and pressing forces. By combining the setting movements (positioning the linings with wear adjustment device 7 and pressing on the brake linings with pressure device 10), the degree of self-energization and thus the progression of the actuating forces can be set without the need of structural changes. If the elastic behavior of the friction brake 1 changes(e.g. due to wear of the brake linings 5), likewise, the combination of the two aforementioned movements can be utilized so as to achieve a progression of the actuating forces which is advantageous for the respective braking application despite the changed data (elastic behavior).

After braking, preferably, the clearance is to be restored so that in the normal, non-braking case, as little unnecessary friction as possible occurs between brake lining 5 and brake disk 3. In the case of a brake caliper 4 implemented as floating caliper with brake linings 5a, 5b arranged on both sides of the brake disk 2 (in case of a disk brake or multiple disk brake), the clearance does not automatically establish itself on both sides after braking, but has to be restored. The reason for this is, that after the end of the braking process, the wear adjustment device 7 restores a small clearance of the brake lining 5, but this clearance occurs initially only on the side of the wear adjusting device 7. Only after the static friction of the floating caliper at its guides is overcome, a clearance can occur also on the second side. For creating a clearance after the braking application for a particularly low-friction run of the wheel on both sides of the brake, preferably, an additional clearance restoration device 40 is provided as described below with reference to the FIGS. 5 and 6.

The clearance restoration device 40 includes of a pin 43 which is arranged in a recess 41 on the movable part of the wear adjustment device 7 such as, e.g., the wear adjustment part 11, and which is spring-loaded by a spring 42 against a stationary part of the disk brake 1 such as, e.g., the wheel bearing part 2. The pin 43 has play in the recess 41 between the resulting stops 44, 45 so that the pin 43 can move in the recess between the stops 44, 45. In the state of braking (FIG. 5), the wear adjustment device 7 is positioned for overcoming the clearance, and the pressure device 10 is actuated so that the brake linings 5a, 5b are pressed against the brake disk 3. During slow and continuous wear adjustment in the course of the wearing process of the brake linings 5a, 5b, the pin 43 will steadily migrate further to the right because the pin is steadily entrained further to the right by the stop 44.

Since after braking, the clearance of brake 1 needs to be restored again, the wear adjustment device 7 first moves the pressure device 10 (which can be implemented as described above) back from the brake disk 3 and thus removes the brake lining 5a from the brake disk 3. At that time, the pressure device 10 is preferably already deactivated. The spring-loaded pin 43 will move from the stop 44 to the stop 45. Due to the static friction in the floating caliper on the guides of the same, the floating caliper will not move up to this moment, i.e., the brake lining 5bwill continue to rest against the brake disk 3. An intentional further lift-off movement by the wear adjustment device 7 (FIG. 6) results in that the stop 45 is supported on the spring-loaded pin 43 thereby shifting the whole floating caliper counter to the lift-off movement (in FIG. 6 to the right). This functions whenever the friction between the spring-loaded pin 43 and the wheel bearing part 2 is greater than the static friction of the floating caliper in its guide, which can be set in a simple manner by suitable selection of the materials or the spring 42. Thus, clearance can be adjusted for both brake linings 5a, 5b. By the normal wear adjustment movement by the wear adjustment device 7, the pin 43 in the recess 42 is entrained by the stop 44. Moreover, FIG. 6 shows a configuration of the friction brake 1, wherein on both brake linings 5a, 5b, a respective pressure device 10 is in engagement.

As an alternative to this, a separate drive could be provided as a clearance restoration device 40 for shifting the movable part of the friction brake 1 in a position in which the brake linings 5 have clearance.

Brake components (e.g. the brake linings 5 or the brake disk 3) heat up during braking and are therefore subjected to a certain thermal expansion. Thus, the case may arise that after the end of the braking process, the pressure device 10 moves back, but that due to thermally expanded components, even with the pressing device being moved back, the brake linings 5 do not lift-off the brake disk 3 and press-on forces remain. As a consequence, this can result in force remaining in the wear adjustment device 7 which are high enough to prevent the latter from generating movement to create a clearance because the available actuating energy of the wear adjustment motor 8 could be too low for this. Thus, the brake would still have residual drag, which could make the situation even worse and could result in locking of the brake. In order to prevent this, the pressing device 10 can be equipped with a travel reserve in the form of an additionally available lift-off travel. When starting the braking process from a home position, this travel reserve is not used. When finishing the braking process, this small travel reserve can be utilized to retract the pressing device 10 beyond the home position and thereby to additionally lift off the holding part 13 in the lift-off direction by the amount of the available travel reserve and thus to facilitate removing the brake linings 5 despite the thermal expansion. The travel reserve can be implemented, e.g., by a suitable selection of the eccentricity E (position and/or angle) or by the configuration of the lift curve of a cam 31. Another possibility is to provide a power reserve in the wear adjustment device 7, preferably in the wear adjustment motor 8, so as to be able, despite the remaining residual forces due to thermal expansion, to release the wear adjustment device 7 and to restore the clearance at the brake linings 5. The two methodsdescribed can be utilized individually or together.

In case of electric actuators such as, e.g., electric motors, currents (voltages) are a good indicator of mechanical forces, torques and power. Thus, in case of this brake, measurements of motor current, voltage, power, as well as additional sensors (force, travel, torque, acceleration) and time measurements, are indicators of the setting conditions (forces, positions of the brake parts, torques, acceleration) of the brake. For this purpose, a control unit 50 can be provided (FIG. 5) which can receive measured values from different sensors 51, 52 arranged on the friction brake, or determines further values from the received measured values (e.g. torque or force from the motor current) and processes the measured values or further values into a control signal and activates the wear adjustment device 7 and/or the pressing device 10 therewith. For this, the control unit 50 is connected via cabling 53 to the sensors 51, 52 and via further cabling 54 to the wear adjustment device 7 and/or the pressure device 10. The control unit 50 can also receive measured values from the wear adjustment device 7 and/or the pressure device 10 such as, e.g., motor current, voltage, power, and can determine other values therefrom. The control unit 50 can also comprise an interface 55, e.g. for exchanging data with a vehicle control unit or engine control unit (ECU). However, the control unit 50 can also be integrated in an ECU.

Electrical circuits (such as for controlling this brake) offer the advantage, compared to hydraulics or pneumatics, that they can relatively easily be configured in a dual-channel or redundant manner and can relatively easily be monitored for functionality through electrical measurements, e.g. by the control unit 50. Thus, for increasing operational safety, this brake can simply be provided with redundant cabling, sensors, actuators (e.g. the wear adjustment motor 8 or the actuating drive 15), electric unit, and/or electronics unit, or the brake can be monitored by the control unit 50 for operational capability (e.g. by measuring currents, comparisons of measured values or of measured values with stored values) and, if necessary, countermeasures can be taken, and/or errors can be indicated. In case of an error, the control unit 50 can try, e.g., to achieve a braking effect with wear adjustment device 7 alone or with the pressure device 10 alone. Also, the individual wheel bakes can be used redundantly, i.e. that in the event of failure of individual wheel brakes (or non-correctable errors), the control unit 50 correspondingly controls the remaining brakes which then take on the given tasks. However, the control unit 50 can also be provided to be redundant.

With the friction brake 1 according to the invention it is also easily possible to implement a parking brake function or a holding aid (against rolling away, "hill holder"). Such functions can be implemented in a simple manner in the control unit 50 which then controls the brake parts correspondingly. For this, e.g., it is particularly advantageous to use the wear adjustment device 7 which is self-locking via the threaded spindle 9, and accordingly, the drive of the wear adjustment device does not have to be permanently energized for maintaining the position, or a pressing device 10 which, in the de-energized state, cannot be set back by the lining press-on forces, or also a combination of wear adjustment device 7 and pressure device 10.

As is known, mechanical brake actuations have a so-called "hysteresis", i.e. unequal behavior when engaging and releasing due to the static friction in actuation. If, e.g., the braking effect is to be slightly reduced the movable parts cannot move yet due to static friction until they finally suddenly reduce the braking effect. This inconvenient behavior can be counteracted with the friction brake 1 according to the invention in that the movable brake components are mounted in a low-friction manner, and/or that during the corresponding actuating and positioning processes, travel control instead of force control is used, and/or the brake hysteresis is known to the control unit 50 and is considered and compensated therein when generating the control signals to the wear adjustment device 7 and/or the pressing device 10. In case of travel control by the control unit 50, the movable parts controlled by a closed loop control have to move; in case of force control, they only move upon overcoming static friction, which could be compensated by the control unit 50, for example. If, e.g., a slightly reduced braking effect is required, the pressing device 10 can be correspondingly moved back by the travel control method, and hysteresis can thus be avoided. Conversely, in case of a necessary significant increase of the braking effect, it is also possible to operate with force control (e.g. via electrical measurements) in order to know the pressing forces and thus, via the known coefficient of friction, the braking forces.

In an embodiment of the friction brake 1 as a multi-disk brake, one multi-disk package would be provided in a known manner on the rotating part, and one multi-disk package would be provided on the stationary part, and clamping the multi-disk packages together can be carried out, e.g., via an outer housing, or, with a hollow shaft around the axle, e.g., the two inner shoes can be forced apart (lining press-on force). The wear adjuster, similar to a multi-disk brake, would be attached before the pressing mechanism. Similar to a floating caliper, the brake linings can be freely movable for self-centering, i.e. wear adjuster and pressure device act on the two brake linings and are movable against fixed parts for self-centering of the linings. Since many embodiment variants of shoe brakes exist, not all of them can be addressed; in common is the pushing-apart movement (internal shoe brake) or pressing-together movement (external shoe brake) of the brake linings.

Since in terms of the basic design, in particular with respect to the pressing device 10 and the wear adjustment device 7, there is no difference between a friction brake and a friction clutch, the above-described friction brake can also be considered or used as friction clutch 60, as described below with reference to the FIGS. 8 and 9. The friction lining 5, which for a friction clutch 60 usually is a whole disk, is here a first clutch disk 62 of the clutch or part of a first clutch disk 62, and the friction surface or the brake disk 3 is the second clutch disk 63. The first 62 and the second clutch disk 63 are pressed against each other by a pressing device 10. However, the first clutch disk 62 of the clutch could also be a disk on which friction linings are attached. As in the case of a friction brake 1, the pressure device 10 could be arranged on a wear adjustment device 7. Thus, very high pressing forces can be generated by the pressing device 10, whereby high torques can be transmitted with such a friction clutch 60.

Figure 8:
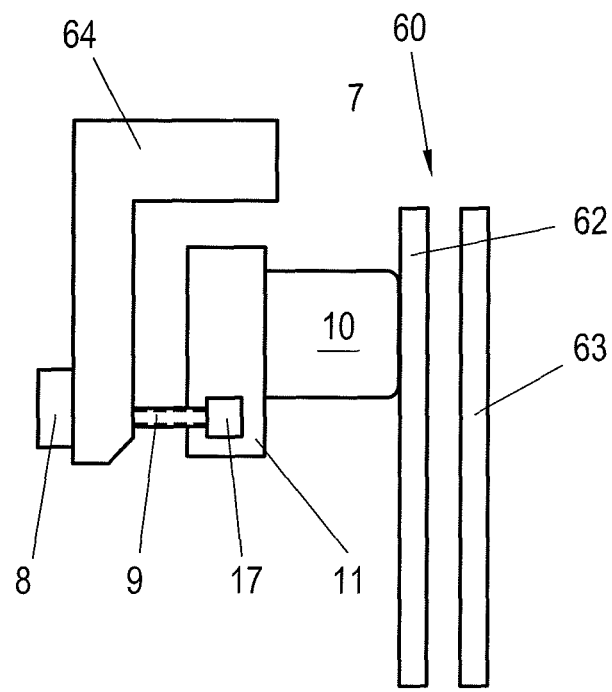
FIGS. 8 and 9 shows usages of the friction brake according to the invention as friction couplings.
Figure 9:
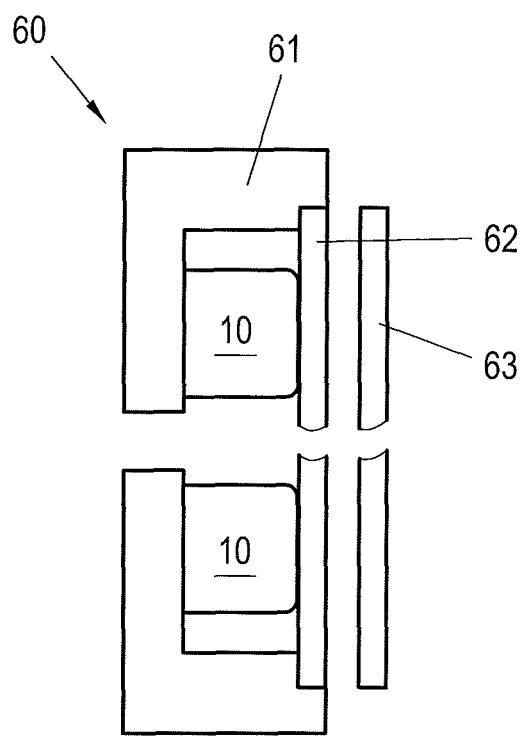

In one embodiment in which the friction lining 5 is arranged resting against the holding part 13 of the pressing device 10, the pressing device 10 and, if necessary, the wear adjustment device 7 can be arranged stationary, as shown in FIG. 8. For this, the pressing device 10 and, if necessary, the wear adjustment device are arranged as described above on a stationary clutch part 64 or another stationary component. This means the first coupling disk 62, if necessary with friction lining, rotates relative to the second clutch disk 63 (brake disk) and is pressed by the pressing device 10 against the second coupling disk 63. Of course, it is also possible to provide in a friction clutch 60 a second pressing device 10 which acts on the second clutch disk 63.

In one embodiment in which the friction lining 5 is rigidly connected to the holding part 13, or the cam 31 engages in a recess 33 of the holding part 13, the pressure device 10 of a friction coupling 60 and the part on which the pressure device 10 is fastened, e.g. a caliper, are arranged such that they rotate together with the clutch disk. For this, a receiving part 61 can be arranged on the first clutch disk 62 such that it rotates together with the latter, wherein on the receiving part, the pressing device 10 (and if present, also the wear adjustment device 7) is arranged. For the purpose of compensating the unbalance resulting therefrom, preferably two diametrically opposing pressure devices 10 and, if necessary, wear adjustment devices 7 are provided. It is of course also possible, as in the case of the friction brake 1, to provide on both sides of the clutch disks in each case one or a plurality of pressing device(s) 10.

The invention claimed is:

1. A friction brake comprising:
    a brake part;
    a friction lining;
    a friction surface;
    a pressing device, arranged on the brake part, being structured and arranged to move during braking toward the friction surface and to press the friction lining against the friction surface;
    a holding part being located on the pressing device so that the friction lining rests against the holding part;
    an actuating part being located on the pressing device and rotatably mounted on the brake part;
    an actuator being structured and arranged to pivot the actuating part about a rotational axis of the actuating part;

a pin being rotatably mounted to the holding part and being arranged on the actuating part; and a rotational axis of the pin being eccentrically arranged with respect to the rotational axis of the actuating part.

2. The friction brake according to claim 1, wherein the brake part comprises a brake caliper and the friction surface comprises a brake disk.

3. The friction brake according to claim 1, wherein the actuating part comprises a shaft piece having an axial end at which the pin is arranged.

4. The friction brake according to claim 1, wherein the actuating part is structured as a hollow shaft with a continuous axial recess eccentrically arranged with respect to a rotational axis of the hollow shaft, and wherein the pin is positioned within the axial recess.

5. The friction brake according to claim 1, wherein the actuating part is structured as a hollow shaft with a continuous axial recess having a non-circular cross-section, and wherein the pin is positioned within the axial recess.

6. The friction brake according to claim 1, wherein the friction lining is rigidly fastened to the holding part.

7. The friction brake according to claim 1, wherein the rotational axis of the pin is positionable in a home position such that, by a resulting eccentricity in distance and angle with respect to the rotational axis of the actuating part, at least one of:

a self-weakening occurs at a beginning of a pressing movement of the brake lining; and a self-energization occurs at an end of a pressing movement.

8. The friction brake according to claim 1, further comprising a lever part coupled to the actuating part and being pivotable by the actuator.

9. The friction brake according to claim 1, further comprising a wear adjustment device coupled to the brake part, wherein the pressing device is arranged on the wear adjustment device.

10. The friction brake according to claim 9, further comprising a wear adjustment drive coupled to the wear adjustment device to drive a threaded spindle to which a threaded sleeve in a wear adjustment part is coupled, wherein the pressing device is arranged on the wear adjustment part.

11. The friction brake according to claim 9, further comprising a clearance restoration device being coupled to the wear adjustment device and being structured and arranged to restore a clearance after braking.

12. The friction brake according to claim 10, wherein the wear adjustment device comprises a movable part having a recess in which a second pin that is spring loaded by a spring against a stationary part of the friction brake is arranged with lateral play in the recess.

13. The friction brake according to claim 12, wherein the movable part of the wear adjustment device comprises the wear adjustment part and the stationary part of the friction brake comprises a wheel bearing part.

14. The friction brake according claim 1, wherein the pressing device is structured and arranged to move a forward distance from a home position toward the friction lining when braking is started, and a retracted distance from the friction lining when braking is finishing;

wherein the retracted distance is greater than the forward distance by an amount equal to a travel reserve during retracting of the holding part beyond the home position.

15. The friction brake according to claim 9, wherein the wear adjustment device is provided with a power reserve to overcome remaining pressing forces after braking.

16. The friction brake according to claim 9, further comprising a control unit coupled to at least one sensor arranged on a part of the friction brake to receive measured values from the at least one sensor and to process the measured values into a control signal, wherein the control unit is coupled to activate at least one of the wear adjustment device and the pressing device.

17. The friction brake according to claim 16, wherein the control unit is coupled to the at least one sensor and to the wear adjustment device via a cabling.

18. The friction brake according to claim 16, wherein the control unit is structured to determine, from the measured values, further values to be processed into the control signal.

19. The friction brake according to claim 16, wherein the control unit is structured and arranged to monitor an operational capability of the friction brake at least one of:

from measured electrical variables;

by comparing measured values; and by comparing measured values to stored values.

20. The friction brake according to claim 19, wherein the control unit is structured and arranged, in the event of an error during braking, to activate one of:

only the wear adjustment device; and only the pressing device.

21. The friction brake according to claim 16, further comprising redundant provisioning of at least one of: the cabling, the at least one sensor; the actuator, the control unit, an electric unit, and an electronic unit of the friction brake.

22. The friction brake according to claim 16, wherein the control unit is structured and arranged to activate at least one of the wear adjustment device and the pressing device to implement one of a parking brake function and a starting aid.

23. The friction brake according to claim 16, wherein one of actuating or positioning processes, the control unit is structured and arranged to determine a travel presetting for at least one of the wear adjustment device and the pressing device, and to transmit a control signal of the travel presetting to at least one of the wear adjustment device and the pressing device.

24. The friction brake according claim 16, wherein a brake hysteresis for the friction brake is stored in the control unit, and the control unit is structured and arranged to compensate the brake hysteresis when generating a control signal to at least one of the wear adjustment device and the pressing device.

25. The friction brake according to claim 1, further comprising a second friction surface is arranged on a side of the friction surface opposite the friction lining, a second friction lining, and a second pressing device, wherein the second friction lining and second pressing device are structured and arranged to act on the second friction surface.

26. The friction brake according to claim 25, wherein one of the pressing device and the second pressing device is arranged on a wear adjustment device.

27. A friction coupling comprising the friction brake according claim 1 and further comprising:

a first coupling disk comprised at least in part by the friction lining; and a second coupling disk comprising the friction surface, wherein the pressing device is structured and arranged to press the first coupling disk against the second coupling disk.

28. The friction coupling according to claim 27, further comprising a wear adjustment device on which the pressing device is arranged.

29. The friction coupling according to claim 28, wherein the pressing device is arranged to not rotate with the first coupling disk.

30. The friction coupling according to claim 29, wherein the wear adjustment device is arranged to not rotate with the first coupling disk.

31. The friction coupling according to claim 27, wherein the pressing device is arranged to rotate with the first coupling disk.

32. The friction coupling according to claim 31, wherein the wear adjustment device is arranged to rotate with the pressing device and the first coupling disk.

33. A friction brake comprising:
a brake part;
a friction lining;
a friction surface;
a pressing device, arranged on the brake part, being structured and arranged to move during braking toward the friction surface and to press the friction lining against the friction surface;
a holding part being located on the pressing device so that the friction lining rests against the holding part;
multiple actuating parts being located on the pressing device and each being rotatably mounted on the brake part;
an actuator being structured and arranged to pivot the actuating parts about respective axes of the actuating parts;
a pin being arranged on each actuating part and each pin being rotatably mounted to the holding part; and
each pin having a rotational axis eccentrically arranged with respect to the rotational axis of a respective actuating part each pin is arranged on.

34. A friction brake comprising:
a brake part;
a friction lining;
a friction surface;
a pressing device, arranged on the brake part, being structured and arranged to move during braking toward the friction surface and to press the friction lining against the friction surface;
a holding part being located on the pressing device so that the friction lining rests against the holding part;
an actuating part being located on the pressing device and rotatably mounted on the brake part, the actuating part being formed as shaft piece with a lever fastened thereto;
an actuator being in engagement with the lever to pivot the actuating part about a rotational axis of the actuating part;
a pin being rotatably mounted to the holding part and being arranged on the actuating part; and
a rotational axis of the pin being eccentrically arranged with respect to the rotational axis of the actuating part.

35. A friction brake comprising:
a brake part;
a friction lining;
a friction surface;
a pressing device, arranged on the brake part, being structured and arranged to move during braking toward the friction surface and to press the friction lining against the friction surface;
a holding part being located on the pressing device so that the friction lining rests against the holding part;
at least two actuating parts, each of the actuating parts being located on the pressing device and being rotatably mounted on the brake part about a respective rotational axis;
an actuator being structured and arranged to pivot the actuating part;
a connecting part being connected to the at least two actuating parts to achieve a forced synchronous movement of the at least two actuating parts;
a pin being arranged on each of the at least two actuating parts and each of the pins being rotatably mounted to the holding part about a respective rotational axis; and
the rotational axis of each pin being eccentrically arranged with respect to the rotational axis of the actuating part each pin is arranged on.

* * * * *